(12) United States Patent
Okabe

(10) Patent No.: US 8,105,199 B2
(45) Date of Patent: Jan. 31, 2012

(54) OUTBOARD MOTOR

(75) Inventor: Yoshihiko Okabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 755 days.

(21) Appl. No.: 12/048,411

(22) Filed: Mar. 14, 2008

(65) Prior Publication Data

US 2008/0227585 A1    Sep. 18, 2008

(30) Foreign Application Priority Data

Mar. 14, 2007   (JP) ................. 2007-064919

(51) Int. Cl.
| F16H 57/10 | (2006.01) |
| F16H 3/44 | (2006.01) |
| F16H 37/06 | (2006.01) |
| B63H 20/14 | (2006.01) |
| B63H 23/00 | (2006.01) |
| B63H 21/21 | (2006.01) |

(52) U.S. Cl. ........ 475/318; 475/271; 475/293; 475/319; 475/330; 440/75; 440/80; 440/86

(58) Field of Classification Search .......... 475/269–271, 475/284, 285, 286, 287, 293, 311–313, 323–325, 475/329, 330; 440/75, 80, 86
See application file for complete search history.

(56) References Cited

U.S. PATENT DOCUMENTS

| 4,016,825 A | * | 4/1977 | Pichl ............................ 440/88 R |
| 4,892,011 A | * | 1/1990 | Nishida et al. ................ 475/159 |
| 4,939,955 A | * | 7/1990 | Sugano .......................... 475/278 |
| 4,957,195 A | * | 9/1990 | Kano et al. .................. 192/106 F |
| 4,963,108 A | * | 10/1990 | Koda et al. ........................ 440/81 |
| 5,006,102 A | * | 4/1991 | Takase et al. .................. 475/282 |
| 5,073,156 A | * | 12/1991 | Garrett et al. ................... 475/56 |
| 5,207,123 A | * | 5/1993 | Petersmann ................... 475/121 |
| 5,525,117 A | * | 6/1996 | Morisawa et al. ............. 475/281 |
| 5,888,108 A | | 3/1999 | Iriono |
| 6,582,259 B1 | * | 6/2003 | Mansson et al. ................. 440/75 |
| 7,485,020 B2 | * | 2/2009 | Nakamura et al. .............. 440/76 |
| 7,704,183 B2 | * | 4/2010 | Nakamura et al. ............. 475/312 |

FOREIGN PATENT DOCUMENTS

| JP | 07-144695 A | 6/1995 |
| JP | 2686517 B2 | 12/1997 |
| WO | WO 2007007707 A1 * | 1/2007 |

* cited by examiner

Primary Examiner — Tisha Lewis
(74) Attorney, Agent, or Firm — Keating & Bennett, LLP

(57) ABSTRACT

A power transmission mechanism transferring a power output from an engine to a propeller includes a transmission planetary gear train that transforms the output power of the engine before it is transferred to the propeller. The transmission planetary gear train includes a transmission sun gear, a transmission double planetary gear set, and a transmission internal gear, in which the transmission sun gear is connected via the first clutch to the input end shaft extending into the engine, and the transmission sun gear is also connected via the second one-way clutch to the housing. In addition, the transmission double planetary gear set is connected via the second clutch to the input end shaft extending into the engine, and the transmission double planetary gear set is also connected via the first one-way clutch to the housing. Further, the transmission internal gear is connected to the output end shaft extending toward the propeller.

11 Claims, 13 Drawing Sheets

FIG. 7A
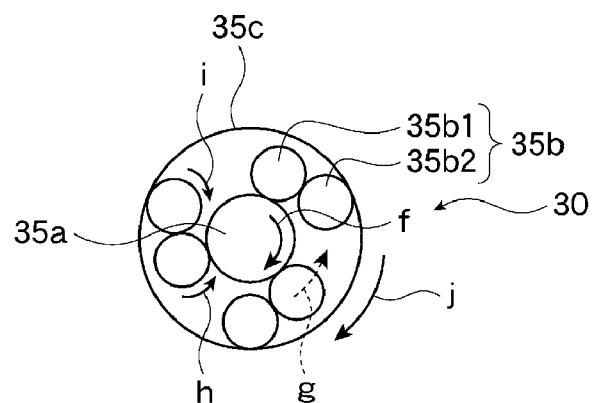
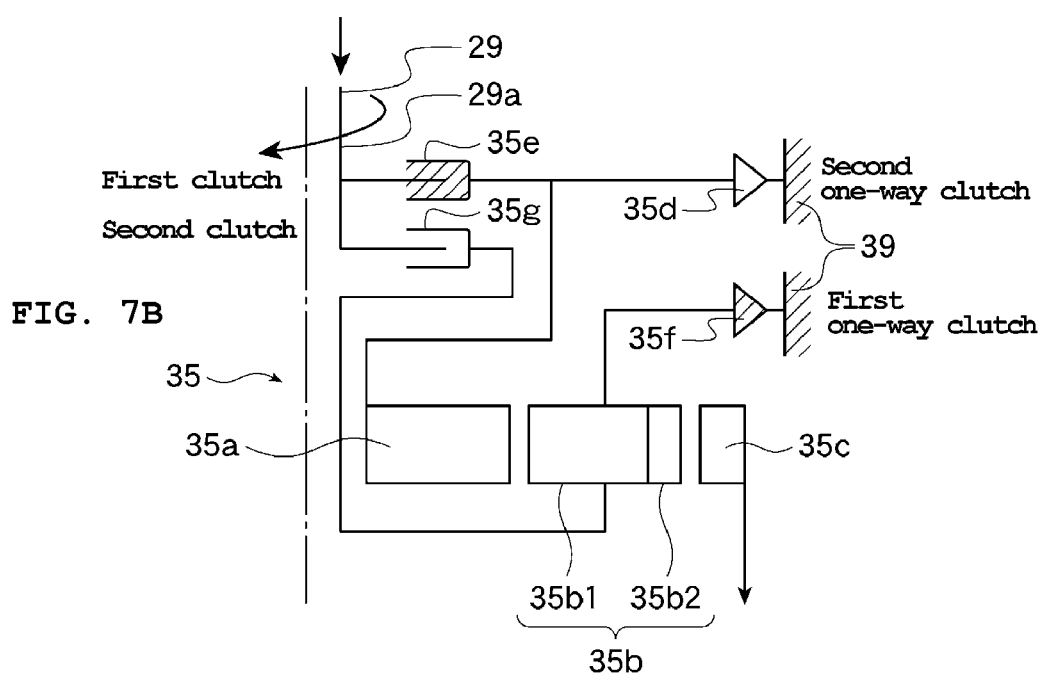
FIG. 7B

FIG. 9A
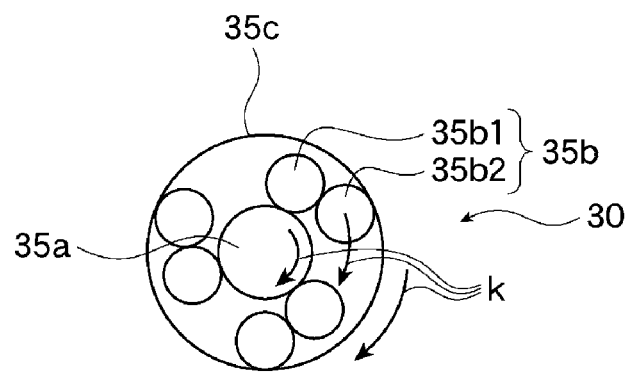
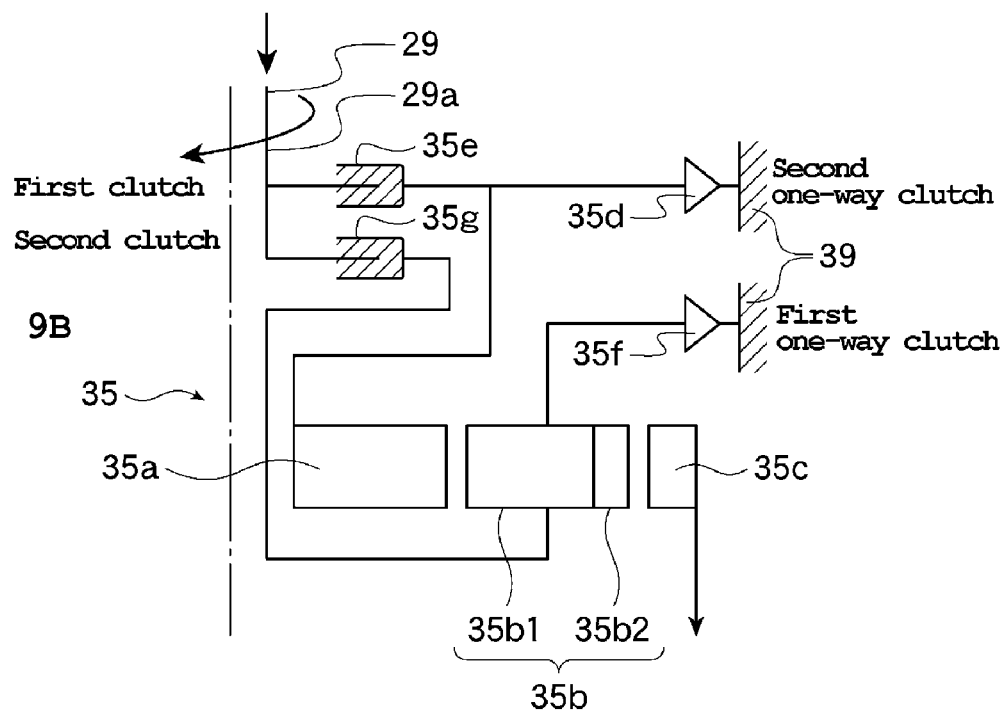
FIG. 9B

OUTBOARD MOTOR

BACKGROUND OF THE INVENTION

1. Field of the Invention

The present invention relates to an outboard motor having a power transmission mechanism to transfer an output power from an engine to a propeller, and more particularly to an outboard motor having a speed change gear structure contained in the transmission mechanism to transform the output power of the engine supplied to the propeller.

2. Background Art

One conventional type of such a mechanism for an outboard motor is described in JP-B-2686517, for instance. JP-B-2686517 discloses an outboard motor in which a first drive shaft is connected to the output shaft of the engine, the second drive shaft is disposed coaxially with the first drive shaft by way of a transmission unit, and a reduction and reversing gear mechanism is arranged to transfer the thrust received by the second drive shaft to a propeller shaft.

The transmission unit is composed of first and second planetary gear trains, with the first and the second planetary gear trains being composed of a sun gear, multiple planetary gears, and an internal gear to which respective planetary gears are engaged.

The rotational center axis of the respective sun gears in the first and the second planetary gear trains are connected by a spindle so that the first and the second planetary gear trains are integrated. The spindle also has a brake mechanism that can be operated from the outside. The first drive shaft transfers its thrust to the internal gear of the first planetary gear train, while the rotational movement of the planetary gear arm for the first planetary gear train generated by the aforementioned thrust transfer is delivered to the second drive shaft. The planetary gear arm for the first planetary gear train is integrated with the internal gear of the second planetary gear train, and a one-way clutch is installed to allow the planetary gear arm for the second planetary gear train to rotate only in the given direction.

It is disclosed that once the brake mechanism is activated, the reduction ratio of the thrust transferred to the second drive shaft becomes smaller compared with such a reduction ratio prior to the activation of the brake mechanism.

In addition, some outboard motors installed on a boat have a first propeller and a second propeller disposed linearly fore and aft facing each other, with the first and the second propellers being rotated in opposite directions by means of a contra-rotating propeller mechanism, as disclosed in JP-A-Hei7-144695 and JP-A-Hei9-263294, for instance.

The exhaust gas is basically discharged into the water in JP-A-Hei7-144695 and JP-A-Hei9-263294. In the course of acceleration, however, the exhaust gas is discharged from the inside of the propeller boss according to JP-A-Hei7-144695, while the exhaust gas is discharged from the outside of the propeller boss according to JP-A-Hei9-263294.

In such conventional mechanisms, however, the transmission unit has the first and the second planetary gear trains arranged in a vertical 2-stage configuration. Thus, it is a complicated structure and a large space is required for its installation.

Generally, it is advantageous in terms of propeller efficiency to drive a propeller having a relatively large diameter and large pitch at low speed, resulting in a higher top speed and improved fuel economy. But, a large pitch propeller needs a larger driving torque during acceleration. Solutions such as providing a turbocharger that adds torque in the low speed range is not very useful when a large pitch propeller is used for the improvement of cruising performance.

SUMMARY OF THE INVENTION

In order to overcome the problems described above, preferred embodiments of the present invention provide an outboard motor having a transmission unit that is compact and simple in structure, and at the same time allows a large reduction gear ratio.

In order to overcome the problems described above, a preferred embodiment of the present invention provides an outboard motor preferably including a power transmission mechanism arranged to transfer an output power from an engine to a propeller, in which the power transmission mechanism includes a transmission planetary gear train that transforms the output power of the engine before transferring the output power of the engine to the propeller. The transmission planetary gear train preferably includes a transmission sun gear, a transmission double planetary gear set, and a transmission internal gear, with a first transmission planetary gear of the transmission double planetary gear meshing with the transmission sun gear, and a second transmission planetary gear of the transmission double planetary gear meshing with the transmission internal gear. The transmission sun gear is preferably connected via a first clutch to an input end shaft extending into the engine, and the transmission sun gear is also connected via a second one-way clutch to a mounting member. The transmission double planetary gear set is connected via a second clutch to the input end shaft extending into the engine, and the transmission double planetary gear set is also connected via a first one-way clutch to a mounting member. The transmission internal gear is connected to an output end shaft extending toward the propeller, and when the first clutch is engaged and the second clutch is disengaged, rotational movement of the transmission double planetary gear set is restricted by the first one-way clutch, causing the transmission sun gear to rotate on its axis, and the transmission internal gear to rotate in the same direction as the transmission sun gear by way of respective transmission planetary gears of the transmission double planetary gear set rotating on their axis so as to deliver a first output power to the output end shaft extending toward the propeller. And, when the second clutch is engaged and the first clutch is disengaged, rotational movement of the transmission sun gear set is restricted by the second one-way clutch, causing the transmission double planetary gear set to make an orbital motion around the transmission sun gear, and the transmission internal gear to rotate in the same direction as the orbital motion of the transmission double planetary gear set around the transmission sun gear, to deliver a second output power to the output end shaft extending toward the propeller. And, when both the first clutch and the second clutch are engaged, the transmission sun gear, the transmission double planetary gear set, and the transmission internal gear rotate integrally to deliver a third output power to the output end shaft extending toward the propeller at a speed equal to the speed at the input end shaft.

According to another preferred embodiment of the present invention, in which a shifting planetary gear train is preferably arranged below the transmission planetary gear train, the shifting planetary gear train preferably includes a shifting sun gear, a shifting double planetary gear set, and a shifting internal gear, with the shifting double planetary gear set being connected to the transmission internal gear, and the shifting sun gear being connected to the output end shaft extending toward the propeller. The shifting internal gear is connected to the mounting member via a reverse/neutral clutch, and the shifting double planetary gear set is connected to the shifting internal gear via a forward clutch. When the forward clutch is engaged, and the reverse/neutral clutch is disengaged, the shifting sun gear, the shifting double planetary gear set, and the shifting internal gear rotate integrally, resulting in the rotational movement of the transmission planetary gears of the transmission planetary gear train and the shifting sun gear of the shifting planetary gear train in the same direction and at the same speed so as to achieve a forward operation state. When both the forward clutch and the reverse/neutral clutch are disengaged, the shifting sun gear, the shifting double planetary gear set, and the shifting internal gear rotate freely and independently, resulting in zero output power from the shifting sun gear of the shifting planetary gear train derived from an input power from the transmission internal gear of the transmission planetary gear train so as to achieve a neutral operation state. And, when the forward clutch is disengaged and the reverse clutch is engaged, the shifting internal gear is locked while the shifting double planetary gear set and the shifting sun gear rotate resulting in the rotational movement of the transmission internal gear of the transmission planetary gear train and the shifting sun gear of the shifting planetary gear train in directions opposite to each other so as to achieve a reverse operation state.

According to another preferred embodiment of the present invention, a cylindrically shaped water pump power shaft is preferably arranged to allow free rotational movement around the output end shaft, wherein the water pump power shaft is connected to the shifting double planetary gear set, and a water pump is drivably connected to the water pump power shaft.

According to another preferred embodiment of the present invention, the respective clutches are preferably defined by multiple disc clutches.

According to another preferred embodiment of the present invention, the outboard motor is preferably provided with a power transmission mechanism to transfer the output power from an engine to a first propeller and a second propeller, as well as a contra-rotating propeller mechanism to rotate the first propeller and the second propeller in directions opposite to each other, and the power transmission mechanism contains the transmission planetary gear train for altering the transmission gear ratio between the input end and the output end.

According to another preferred embodiment of the present invention, the contra-rotating propeller mechanism preferably includes two driven gears to drive the first propeller and the second propeller, respectively, as well as a pinion gear that simultaneously drives the two driven gears, and the output end shaft of the power transmission mechanism is connected to the pinion gear.

The various preferred embodiments of the present invention provide the following effects.

According to a preferred embodiment described above, the power transmission mechanism which transfers the output power from the engine to the propeller is provided with a transmission planetary gear train that transforms the output power of the engine before transferring the output power of the engine to the propeller. The transmission planetary gear train preferably includes a transmission sun gear, a transmission double planetary gear set, and a transmission internal gear, with a first transmission planetary gear of the transmission double planetary gear meshing with the transmission sun gear, and a second transmission planetary gear of the transmission double planetary gear meshing with the transmission internal gear. The transmission sun gear is connected via a first clutch to an input end shaft extending into the engine, and the transmission sun gear is also connected via a second one-way clutch to a mounting member. The transmission double planetary gear set is connected via a second clutch to the input end shaft extending into the engine, and the transmission double planetary gear set is also connected via a first one-way clutch to a mounting member. The transmission internal gear is connected to an output end shaft extending toward the propeller. The output power is delivered to the output end shaft extending toward the propeller as the first output power, the second output power, and the third output power so as to allow the transmission unit to be constructed in a compact size and have a simple structure, and at the same time enables the use of a large reduction gear ratio.

In addition, since the rotational speed change is carried out by the transmission planetary gear train having the transmission sun gear, transmission double planetary gear set, and the transmission internal gear, the gear change can be attained without interrupting the output power or without changing the meshing between the gears during the gear change operation, and the force for driving the propeller is not interrupted. Thus, for boats having a substantially larger running resistance than land transportation vehicles, the gear change operation can be made easily, even in the course of acceleration, and the optimized gear change timing is assured.

According to a preferred embodiment of the present invention described above, an in-line shifting planetary gear train having a shifting sun gear, a shifting double planetary gear set, and a shifting internal gear are preferably arranged below the transmission planetary gear train to carry out the gear shift operation. Thus, the transmission system and the shifting unit can be connected together to have a compact size.

According to a preferred embodiment of the present invention described above, a cylindrically shaped water pump power shaft is arranged to allow free rotational movement around the output end shaft, wherein the water pump power shaft is connected to the shifting double planetary gear set, and a water pump is drivably connected to the water pump power shaft. Thus, the water pump power shaft always rotates in one direction to assure the proper function of the water pump. The function of the water pump may be jeopardized if it rotates in the opposite direction.

According to a preferred embodiment of the present invention described above, the respective clutches are defined by multiple disc clutches which further permit a simple structure.

According to a preferred embodiment of the present invention described above, the power transmission mechanism has a transmission planetary gear train arranged to alter the transmission gear ratio between the input end and the output end depending on the engine speed, and an especially large reduction gear ratio may be selected in the low speed range to obtain the adequate driving torque characteristics and the maximum propeller performance. Thus, the holeshot and the acceleration performance, as well as the reverse braking performance, can be improved dramatically.

On the other hand, when a large pitch propeller is used to attempt to attain higher propeller efficiency, a large driving torque obtained in the lower speed range can prevent the deterioration of the acceleration performance. Improved fuel economy and a higher top speed can also be achieved at the same time through the advantages of a large pitch propeller.

According to a preferred embodiment described above, the output end of the transmission planetary gear train is preferably connected to the pinion gear, and thus, there is no need to change the rotational speed between the pinion gear and the driven gears. Thereby, a higher degree of freedom is assured in the gear design, enabling to design gears having a compact size.

Other features, elements, steps, characteristics and advantages of the present invention will become more apparent from the following detailed description of preferred embodiments of the present invention with reference to the attached drawings.

BRIEF DESCRIPTION OF DRAWINGS

FIGS. 7A and 7B are illustrative drawings of the transmission planetary gear train in the first gear speed included in the power transmission mechanism according to the first preferred embodiment of the present invention.

FIGS. 9A and 9B are illustrative drawings of the transmission planetary gear train in the third gear speed included in the power transmission mechanism according to the first preferred embodiment of the present invention.

DETAILED DESCRIPTION OF THE PREFERRED EMBODIMENTS

Preferred embodiments of an outboard motor according to the present invention will be described below. However, the preferred embodiments of the present invention are merely examples of the present invention, and the present invention is not limited to the preferred embodiments.

FIGS. 1 through 12 show the first preferred embodiment according to the present invention.

Figure 1:
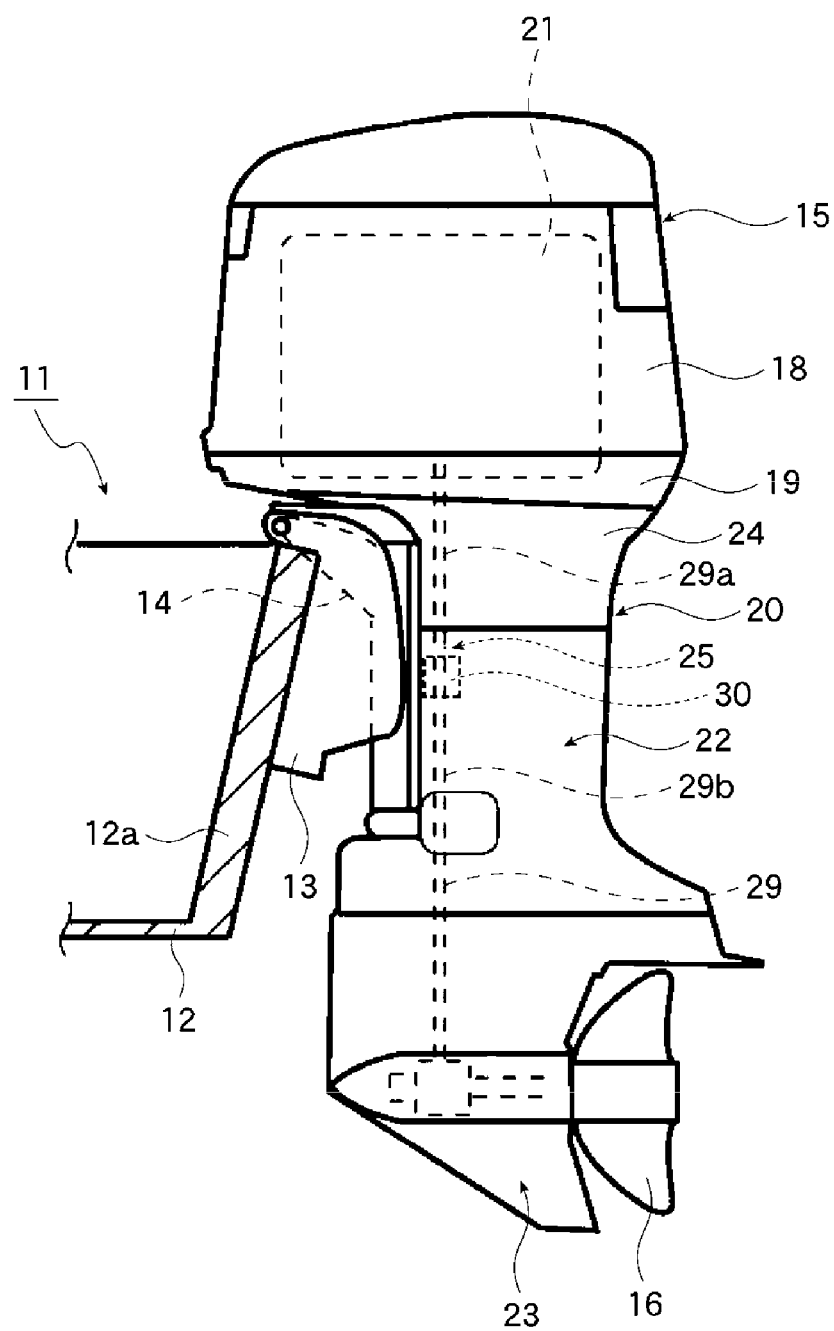
FIG. 1 is a side view of an outboard motor mounted on a boat according to a first preferred embodiment of the present invention.

Starting with a description of the structure, a clamp bracket 13 is fixed to a transom plate 12a on a hull 12 of a boat 11, and a swivel bracket 14 is mounted in a vertically pivotable manner to the clamp bracket 13 as shown in FIG. 1. An outboard motor 15 is installed in a horizontally pivotable manner to the swivel bracket 14. The outboard motor has a propeller 16.

The outboard motor 15 has an upper cowling 18, a bottom cowling 19, and a casing 20. An engine 21 is provided within the upper cowling 18 and the bottom cowling 19. The casing 20 is defined by an upper case 22 and a lower case 23. The upper portion of the upper case 22 is covered by an apron 24.

A power transmission mechanism 25 for transferring the output power from the engine 21 to the propeller 16 is provided within the upper case 22 and the lower case 23.

Figure 2:
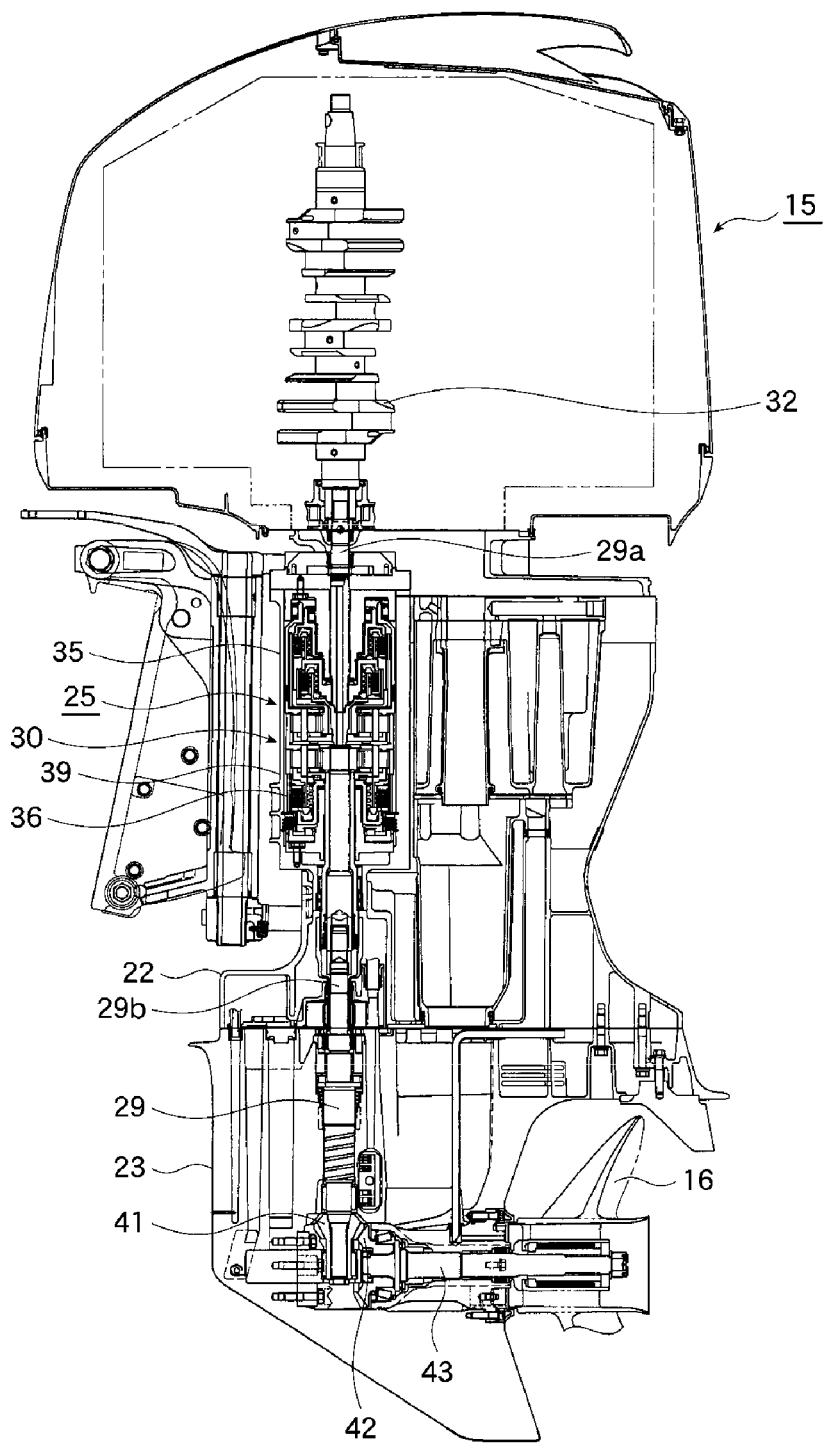
FIG. 2 is a cross-sectional view of the outboard motor according to the first preferred embodiment of the present invention.

As shown in FIG. 2, the power transmission mechanism 25 has a drive shaft 29 arranged to run vertically within the upper case 22 and the lower case 23. The drive shaft 29 has a transmission/shifting unit 30 at approximately the middle thereof. The transmission/shifting unit 30 is configured to alter the transmission gear ratio between the input end and the output end, and is also configured to shift into forward, neutral, or reverse gears depending on the engine speed and the engine operating conditions.

An input end shaft 29a and an output end shaft 29b of the driveshaft 29 are arranged coaxially with a crankshaft 32. The output power from the engine 21 is transferred to the input end shaft 29a via the crankshaft 32, and at the same time, the output power from the transmission/shifting unit 30 is transferred to the propeller 16 via the output end shaft 29b.

The transmission/shifting unit 30 has a transmission planetary gear train 35 to change the rotational speed, and a shifting planetary gear train 36 provided below the transmission planetary gear train 35 to shift gears. By providing the shifting planetary gear train 36, a shift rod, a shift cam, an offset pin, a dog clutch, and one of the driven gears can be eliminated.

As shown in FIGS. 3 through 6, the transmission planetary gear train 35 of the transmission/shifting unit 30 preferably includes a transmission sun gear 35a, a transmission double planetary gear set 35b, a transmission internal gear 35c, and so on within a housing 39.

Figure 4:
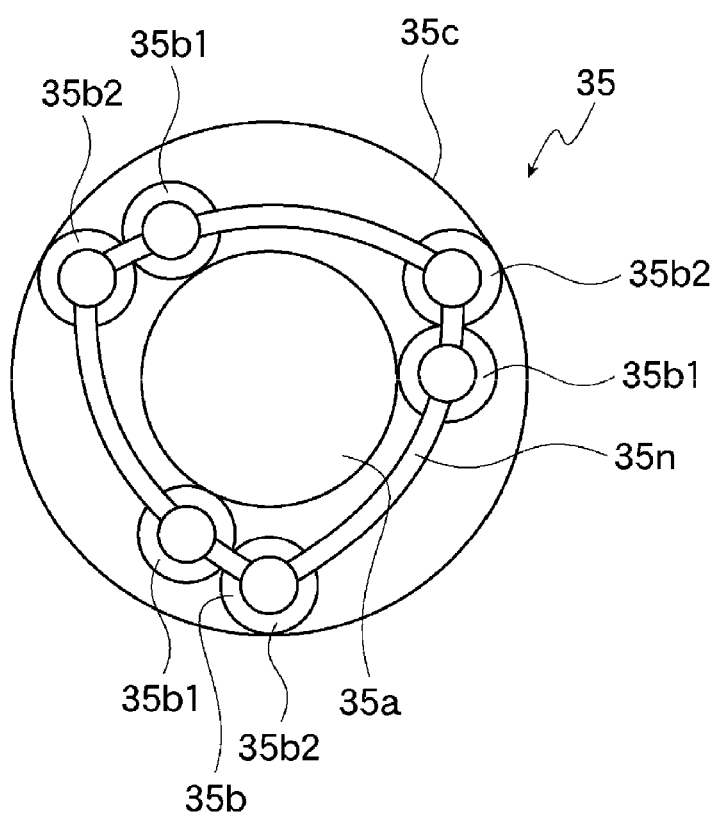
FIG. 4 is a schematic plan view of a transmission planetary gear train included in the power transmission mechanism according to the first preferred embodiment of the present invention.
Figure 5:
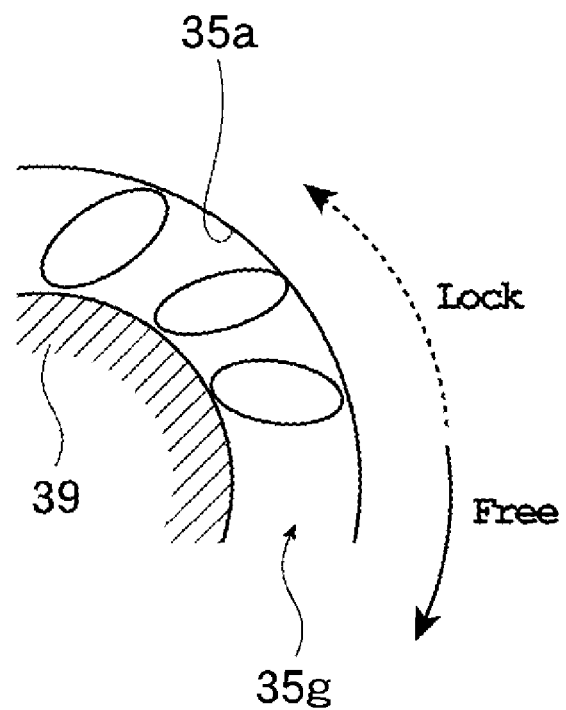
FIG. 5 is a schematic view of a one-way clutch according to the first preferred embodiment of the present invention.
Figure 6:
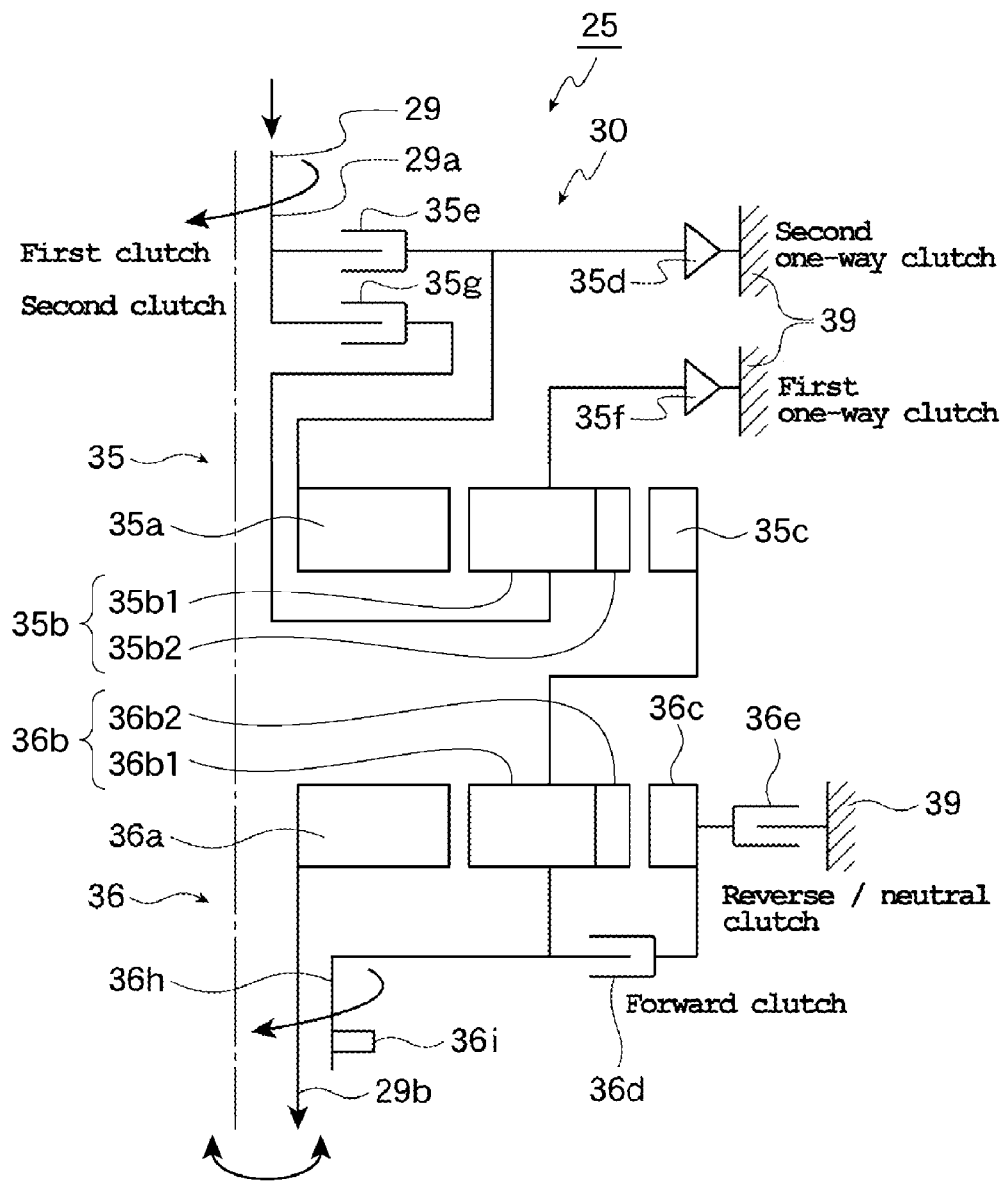
FIG. 6 is a schematic view of the power transmission mechanism according to the first preferred embodiment of the present invention.

As shown in FIG. 4, multiple pairs of first and second transmission planetary gears 35b1, 35b2 meshed with each other are connected by a carrier 35n in the transmission double planetary gear set 35b. The first transmission planetary gears 35b1 are also meshed with the transmission sun gear 35a, and the second transmission planetary gears 35b2 are also meshed with the transmission internal gear 35c.

The transmission sun gear 35a is connected to the housing 39 which corresponds to the mounting member via a second one-way clutch 35d so that rotational movement in one direction is allowed while rotational movement in the opposite direction is restricted. Also, the transmission sun gear 35a is connected to the input end shaft 29a via a first clutch 35e.

Further, the transmission double planetary gear set 35b is connected to the housing 39 which corresponds to the mounting member via a first one-way clutch 35f so that rotational movement in one direction is allowed while rotational movement in the opposite direction is restricted. Also, the transmission double planetary gear set 35b is connected to the input end shaft 29a via a second clutch 35g.

As shown in FIG. 2, the second clutch 35g and the first clutch 35e are preferably multiple disc clutches so as to allow engagement or disengagement.

The second clutch 35g and the first clutch 35e are engaged such that each of the pistons 35h1, 35h2 are hydraulically pressed downward to resist the urging force of the springs 35*i*1, 35*i*2, resulting in clutch plates 35*j*1, 35*j*2 being in pressure contact with each other.

Hydraulic pressure is exerted via a control valve on the pistons 35*h*1, 35*h*2 by driving an oil pump (not shown) disposed on the input end shaft 29*a*. The control valve is controlled by an ECU (Engine Control Unit) not shown, to open and close at a predetermined timing. Shift control into and out of the first, second, or third gear speeds are carried out by the transmission planetary gear train 35, each clutch 35*g*, and so on. Specific shift control procedures will be described below.

As shown in FIGS. 3 through 6, the shifting planetary gear train 36 has a shifting sun gear 36*a*, a shifting double planetary gear set 36*b*, and a shifting internal gear 36*c*. The shifting double planetary gear set 36*b* has first shifting planetary gears 36*b*1 and second shifting planetary gears 36*b*2. Each of the first shifting planetary gears 36*b*1 and the second shifting planetary gears 36*b*2 are meshed with each other. The first shifting planetary gears 36*b*1 are also meshed with the shifting sun gear 36*a*, and the second shifting planetary gears 36*b*2 are also meshed with the shifting internal gear 36*c*.

Also, as shown in FIGS. 3 through 6, the shifting double planetary gear set 36*b* in the shifting planetary gear train 36 is connected to the transmission internal gear 35*c*. Further, the shifting double planetary gear set 36*b* is connected to the shifting internal gear 36*c* via a forward clutch 36*d*, and the shifting internal gear 36*c* is connected to the housing 39 via a reverse/neutral clutch 36*e*.

Figure 3:
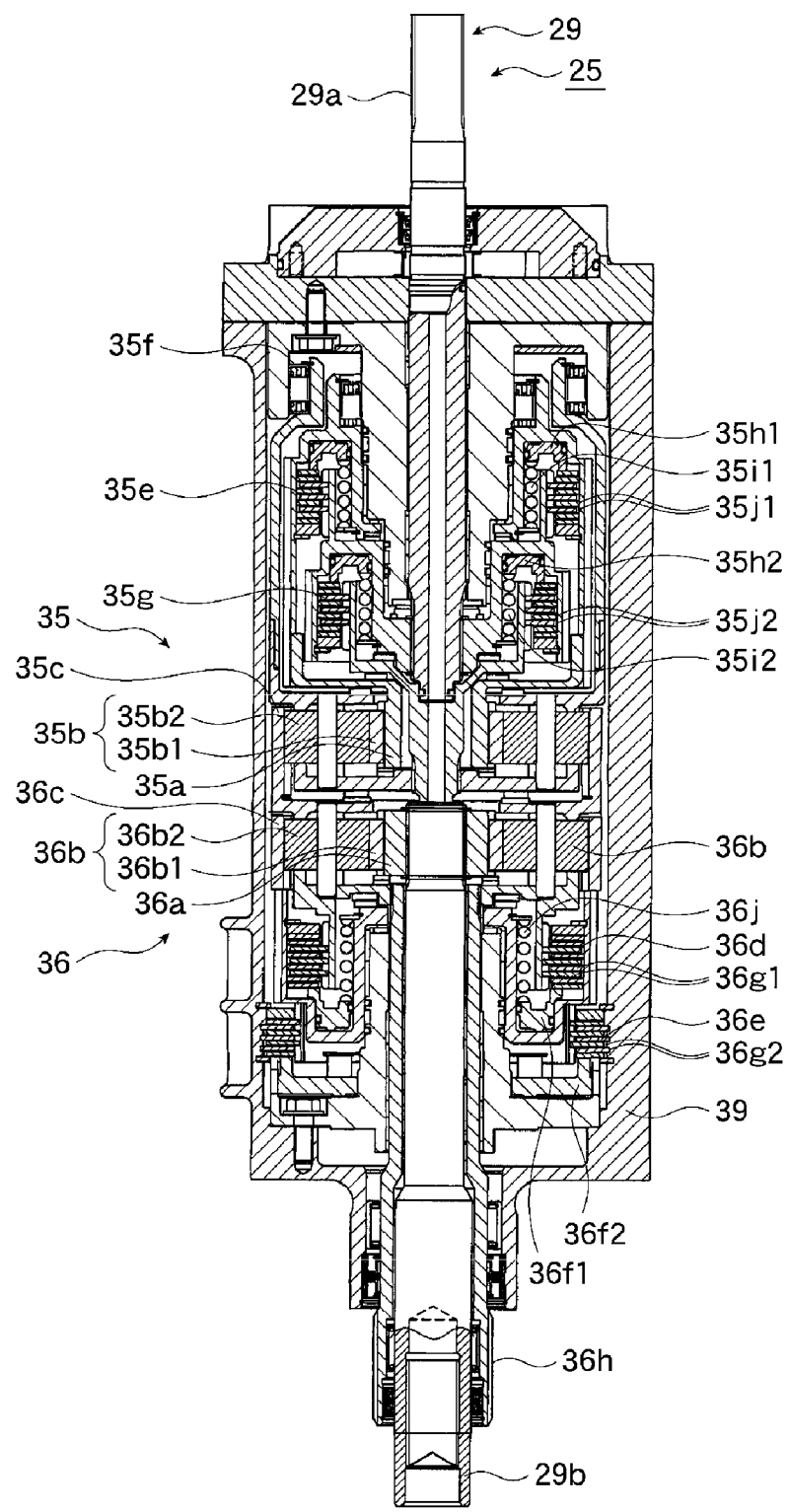
FIG. 3 is a cross-sectional view of a power transmission mechanism according to the first preferred embodiment of the present invention.

As shown in FIG. 3, pistons 36*f*1, 36*f*2 are provided to the clutches 36*d*, 36*e*, respectively. The hydraulic pressure from the oil pump (not shown) is exerted on each of the pistons 36*f*1, 36*f*2 via a control valve. The control valve is connected to and controlled by the ECU (not shown). Also, the piston 36*f*1 is arranged to be urged by a spring 36*j*.

Further, clutch plates 36*g*2 of the reverse/neutral clutch 36*e* are in pressure contact with each other by the hydraulic pressure exerted on the piston 36*f*2 to fix the shifting internal gear 36*c* to the housing 39, while the clutch plates 36*g*1 of the forward clutch 36*d* are in pressure contact with each other by the hydraulic pressure exerted on the piston 36*f*1 to fix the shifting internal gear 36*c* to the shifting double planetary gear set 36*b*. When the hydraulic pressure is not exerted, the clutch plates 36*g*1, 36*g*2 of respective clutches 36*d*, 36*e* are not in pressure contact, allowing independent free rotational movement of the shifting internal gear 36*c* and other parts.

Still further, the shifting sun gear 36*a* has the output end shaft 29*b* extending downward. A water pump power shaft 36*h* having a cylindrical shape is provided around the output end shaft 29*b*, and the water pump power shaft 36*h* is connected to the shifting double planetary gear set 36*b*.

A water pump 36*i* is connected to the lower end of the water pump power shaft 36*h* for delivering cooling water into the engine 21. In some cases, the water pump 36*i* is disposed coaxially with the water pump power shaft 36*h*, or connected to the water pump power shaft 36*h* by way of gears or other devices.

As shown in FIG. 2, a pinion gear 41 is integrally and rotatably provided at the lower end of the output end shaft 29*b*, and is meshed with a driven gear 42 for driving the propeller 16. A bevel gear is used for the pinion gear 41 and the driven gear 42, respectively, and these bevel gears are meshed with each other. Such an arrangement transfers the output power from the pinion gear 41 to the driven gear 42, the propeller shaft 43, and to the propeller 16 in this order.

Next, the transmission and the shifting actions of the outboard motor 15 will be described.

As the engine 21 is operated, the output power from the engine 21 is transferred from the crankshaft 32 to the input end shaft 29*a* on the drive shaft 29 to carry out the transmission or shifting through the transmission/shifting unit 30, causing the output end shaft 29*b* to be rotationally driven in the given direction at the given speed. The rotational movement of the output end shaft 29*b* is then transferred to the driven gear 42 by way of the pinion gear 41, causing the driven gear 42 to be rotationally driven. Consequently, the propeller 16 is rotationally driven by way of the propeller shaft 43 in the given direction at the given speed.

First, the transmission action will be described.
Description of the First Gear Speed As shown in FIGS. 7A and 7B, the ECU activates the control valve to engage the first clutch 35*e*, and the output power from the input end shaft 29*a* is transferred to the transmission sun gear 35*a*. The transmission sun gear 35*a* rotates in the direction of arrow "f" in FIG. 7A. At the same time, since the rotation of the transmission double planetary gear set 35*b* in the direction of dashed line arrow "g" is restricted by the first one-way clutch 35*f*, the first and the second transmission planetary gears 35*b*1, 35*b*2 rotate in the direction of arrows "h" and "i" respectively, to make the transmission internal gear 35*c* rotate in the direction of "j".

Figure 8A:
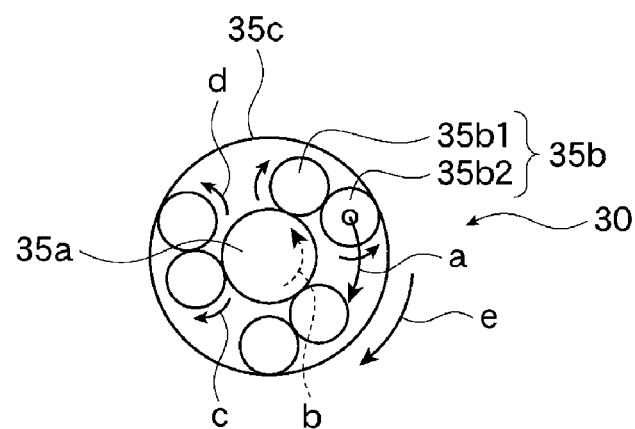
FIGS. 8A and 8B are illustrative drawings of the transmission planetary gear train in the second gear speed included in the power transmission mechanism according to the first preferred embodiment of the present invention.
Figure 8B:
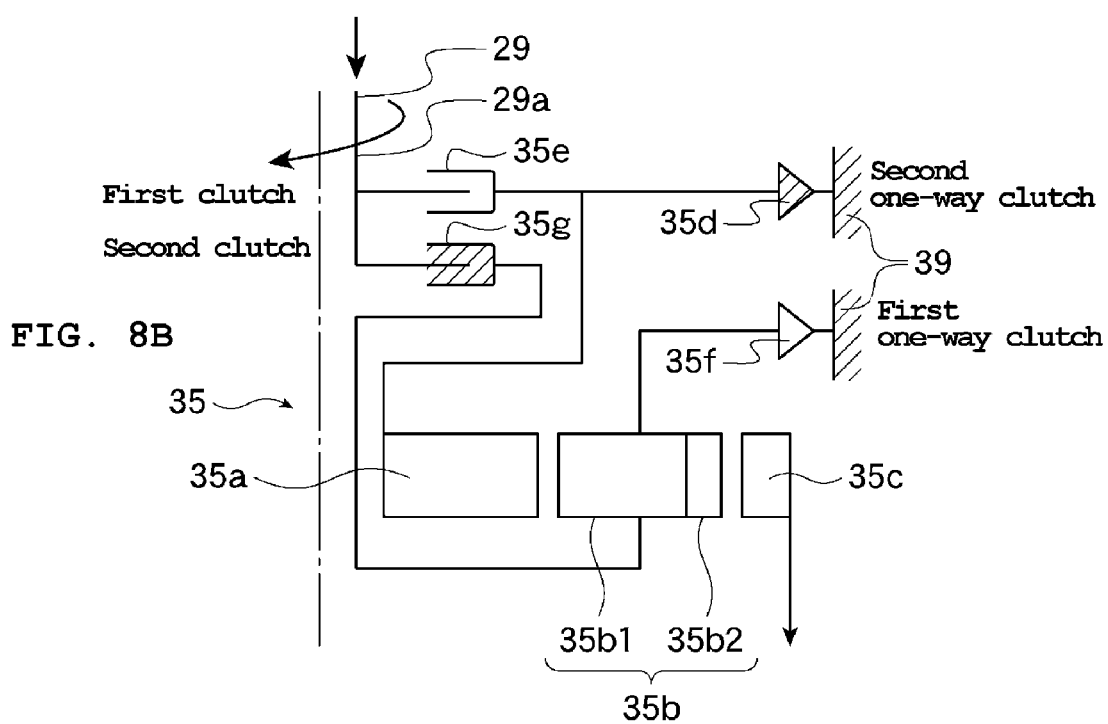

The rotational movement of the transmission internal gear 35*c* is transferred to the shifting planetary gear train 36.
Description of the Second Gear Speed As shown in FIGS. 8A and 8B, the ECU activates the control valve to engage the second clutch 35*g*, and the output power from the input end shaft 29*a* is transferred to the transmission double planetary gear set 35*b*. The transmission double planetary gear set 35*b* rotates in the direction of arrow "a" in FIG. 8A. At the same time, since the rotation of the transmission sun gear 35*a* in the direction of dashed line arrow (b) is restricted by the second one-way clutch 35*d*, the transmission sun gear 35*a* does not rotate, and the first and the second transmission planetary gears 35*b*1, 35*b*2 move in the direction of arrow "a" while rotating on their axes in the direction of arrows "c" and "d" respectively. This causes the transmission internal gear 35*c* to rotate in the direction of "e" at the reduced rotational speed from that of the input end shaft 29*a*.

The rotational movement of the transmission internal gear 35*c* is transferred to the shifting planetary gear train 36.
Description of the Third Gear Speed As shown in FIGS. 9A and 9B, the ECU activates the control valve to engage the second clutch 35*g* and the first clutch 35*e* respectively. Then, the entire transmission planetary gear train 35 rotates collectively in the direction of the arrow "k". The rotation of the transmission internal gear 35*c* included in the transmission planetary gear train 35 is transferred to the shifting planetary gear train 36.

When $\lambda$ (the gear ratio of the transmission sun gear 35*a* to the transmission internal gear 35*c*) is 0.42 in the arrangement described above, the GR (the reduction gear ratio) at the first gear speed is 2.38, the GR at the second gear speed is 1.72, and the GR at the third gear speed is 1, for example. This means that a large reduction gear ratio can be obtained.

In the arrangement described above, the reduction gear ratio obtained by engaging the first clutch 35*e* with the first one-way clutch 35*f* as shown in FIGS. 7A and 7B for the first gear speed, preferably is larger than the reduction gear ratio obtained by engaging the second clutch 35*g* with the second one-way clutch 35*d* as shown in FIGS. 8A and 8B for the second gear speed. However, the present invention is not limited to these reduction gear ratios. A large reduction gear ratio may be provided by altering the gear ratios between the gears.

Next, the shifting action will be described.

Description of the Forward Operation

Figure 10A:
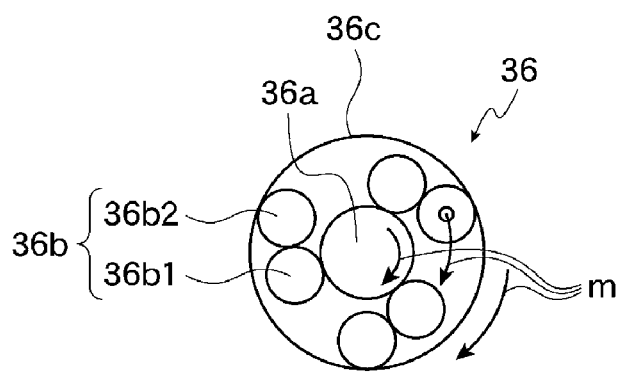
FIGS. 10A and 10B are illustrative drawings of the shifting planetary gear train in the forward operation state included in the power transmission mechanism according to the first preferred embodiment of the present invention.
Figure 10B:
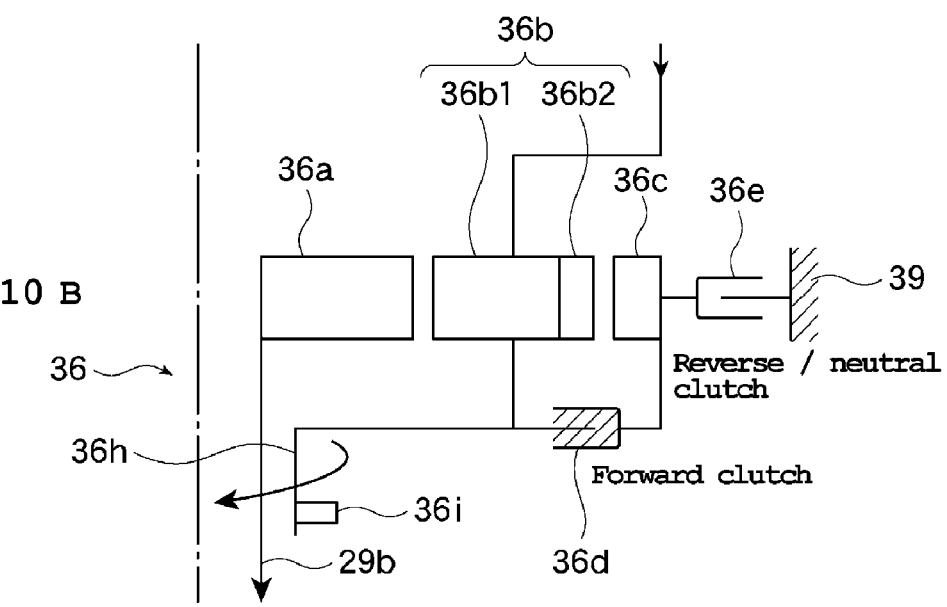

In the forward operation, the ECU activates the control valve to disengage the reverse/neutral clutch 36e and to engage the forward clutch 36d as shown in FIGS. 10A and 10B. Then, the shifting internal gear 36c, the shifting double planetary gear set 36b, and the shifting sun gear 36a rotate collectively in the direction of the arrow "m" in FIG. 10A, making the rotational movement synchronized with the transmission planetary gear train 35 to achieve the forward operation state.

Description of the Neutral Operation

Figure 11A:
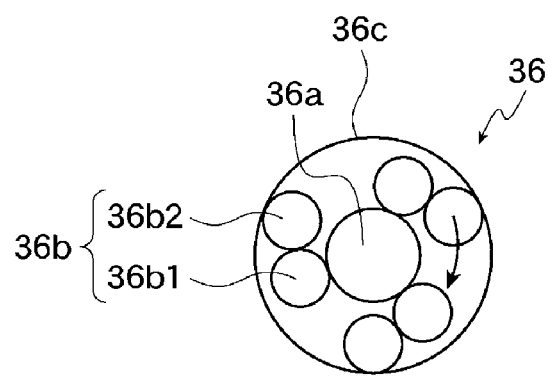
FIGS. 11A and 11B are illustrative drawings of the shifting planetary gear train in the neutral operation state included in the power transmission mechanism according to the first preferred embodiment of the present invention.
Figure 11:
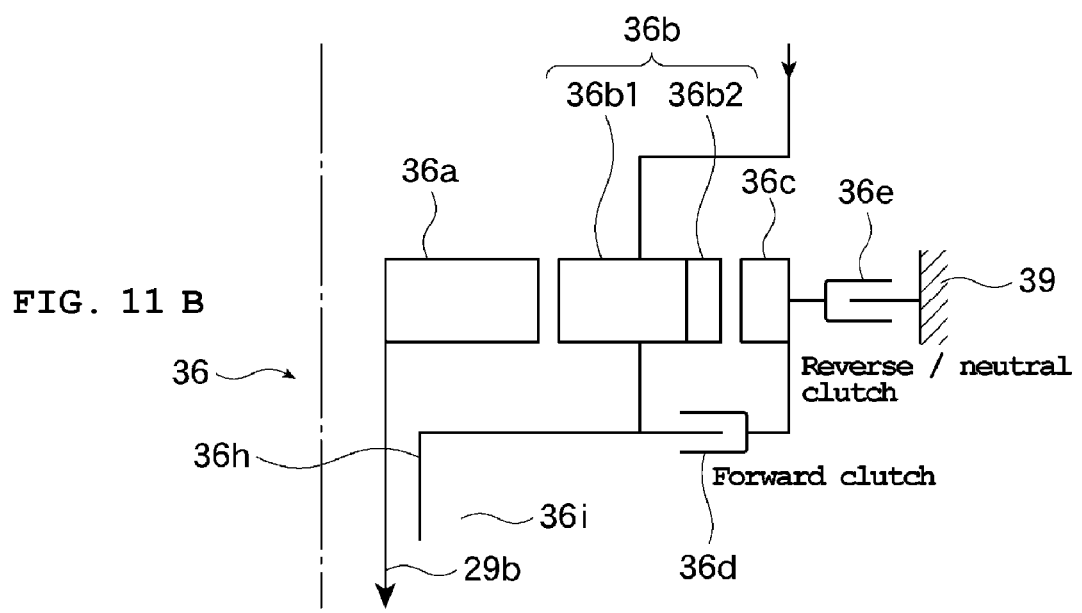

In the neutral position, the ECU activates the control valve to disengage the forward clutch 36d and the reverse/neutral clutch 36e respectively as shown in FIGS. 11A and 11B. Then, the shifting internal gear 36c, the first and the second shifting planetary gears 36b1, 36b2, and the shifting sun gear 36a rotate independently and freely, disabling the transfer of the output power to the output end shaft 29b even when the torque from the transmission planetary gear train 35 is input to the shifting double planetary gear set 36b. Consequently the neutral operation state is achieved.

Description of the Reverse Operation

Figure 12A:
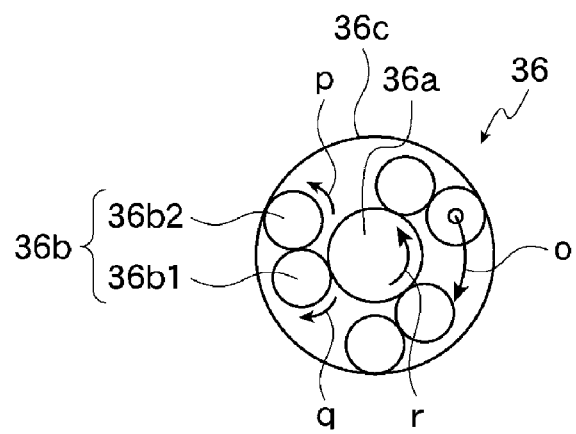
FIGS. 12A and 12B are illustrative drawings of the shifting planetary gear train in the reverse operation state included in the power transmission mechanism according to the first preferred embodiment of the present invention.
Figure 12:
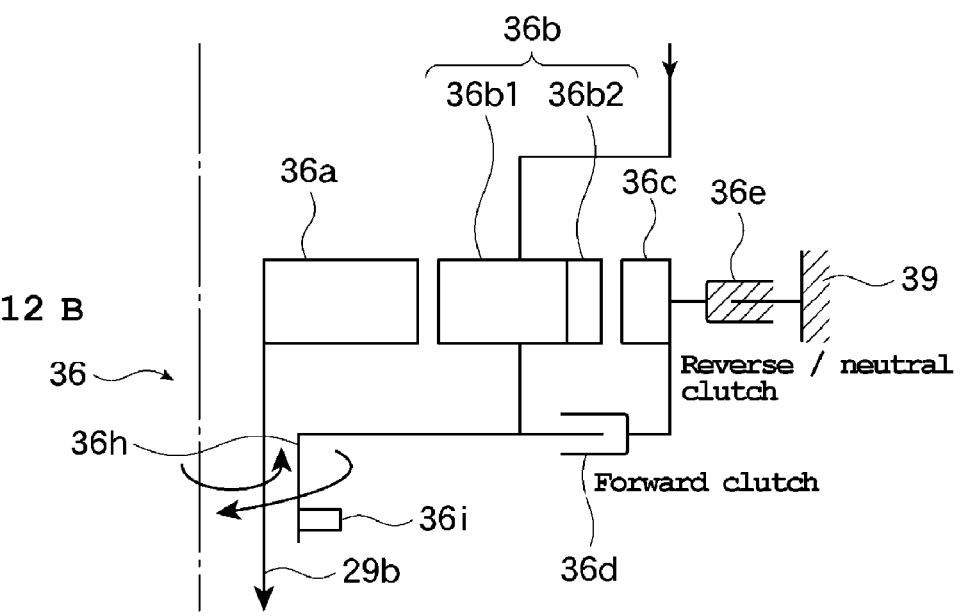

In the reverse operation, the ECU activates the control valve to engage the reverse/neutral clutch 36e and to disengage the forward clutch 36d as shown in FIGS. 12A and 12B. Then, the shifting internal gear 36c is fixed to the housing 39. When the torque from the transmission planetary gear train 35 is input to the shifting double planetary gear set 36b, the first and the second shifting planetary gears 36b1, 36b2 of the shifting double planetary gear set 36b rotate in opposite directions with respect to each other, that is, in the direction of arrows "q" and "p" respectively, while moving along the inside of the shifting internal gear 36c in the direction of arrow "o" in FIG. 12A. Consequently, the rotational direction of the shifting sun gear 36a, that is, the direction of arrow "r" in FIG. 12A, becomes opposite to the rotational direction of the shifting double planetary gear set 36b, that is, the direction of arrow "o" in FIG. 12A to achieve the reverse operation state.

By the way, the water pump power shaft 36h is attached to the shifting double planetary gear set 36b to rotate consistently in one direction. Thus, the water pump 36i for the water pump power shaft 36h always rotates in one direction to maintain the function of the water pump 36i consistently. It should be noted that the water pump 36i is preferably the type of pump that can fulfill the pumping function while it is rotating in one direction, but cannot fulfill its function when it rotates in the opposite direction.

In the arrangement described above, a three-speed gear shift of first, second, and third gear speeds can be attained using the single-stage transmission planetary gear train 35 by combining the transmission planetary gear train 35 having the transmission double planetary gear set 35b with respective clutches 35d and so on. This allows the power transmission mechanism to be compact in size and to have a large reduction gear ratio. Consequently, the propeller 16 having a larger capacity can be effectively driven, resulting in improved acceleration and fuel economy.

In addition, since the transmission planetary gear train 35 has an in-line configuration defined by the transmission sun gear 35a, transmission double planetary gear set 35b, and the transmission internal gear 35c, gear changes can be attained without interrupting the output power or without changing the mesh between the gears during the gear change operation, and the force for driving the propeller is not interrupted. Thus, for boats having a substantially larger running resistance than land transportation vehicles, the gear change operation can be made easily, even in the course of acceleration, and the optimized gear change timing is assured.

Further, an especially large reduction gear ratio is selected in the low speed range to obtain adequate driving torque characteristics and the maximum propeller performance. Thus, the holeshot and the acceleration performance, as well as the reverse braking performance can be improved dramatically.

On the other hand, when a large pitch propeller is used to attempt to attain higher propeller efficiency, a larger driving torque obtained in the lower speed range can prevent the deterioration of the acceleration performance. Improved fuel economy and a higher top speed can be obtained at the same time due to the advantages of a large pitch propeller.

The vertical arrangement of the transmission planetary gear train 35 in the upper portion and the shifting planetary gear train 36 in the lower portion allows a compact configuration. The structure of the mechanism is extremely simplified because there is no need for providing a dog clutch and systems for driving the dog clutch, and at the same time, only one driven gear 42 instead of a pair of driven gears is required.

Although the shifting planetary gear train 36 is arranged below the transmission planetary gear train 35 in the present preferred embodiment, it may be practicable to replace the shifting planetary gear train 36 with a traditional dog clutch.

Second Preferred Embodiment

Figure 13:
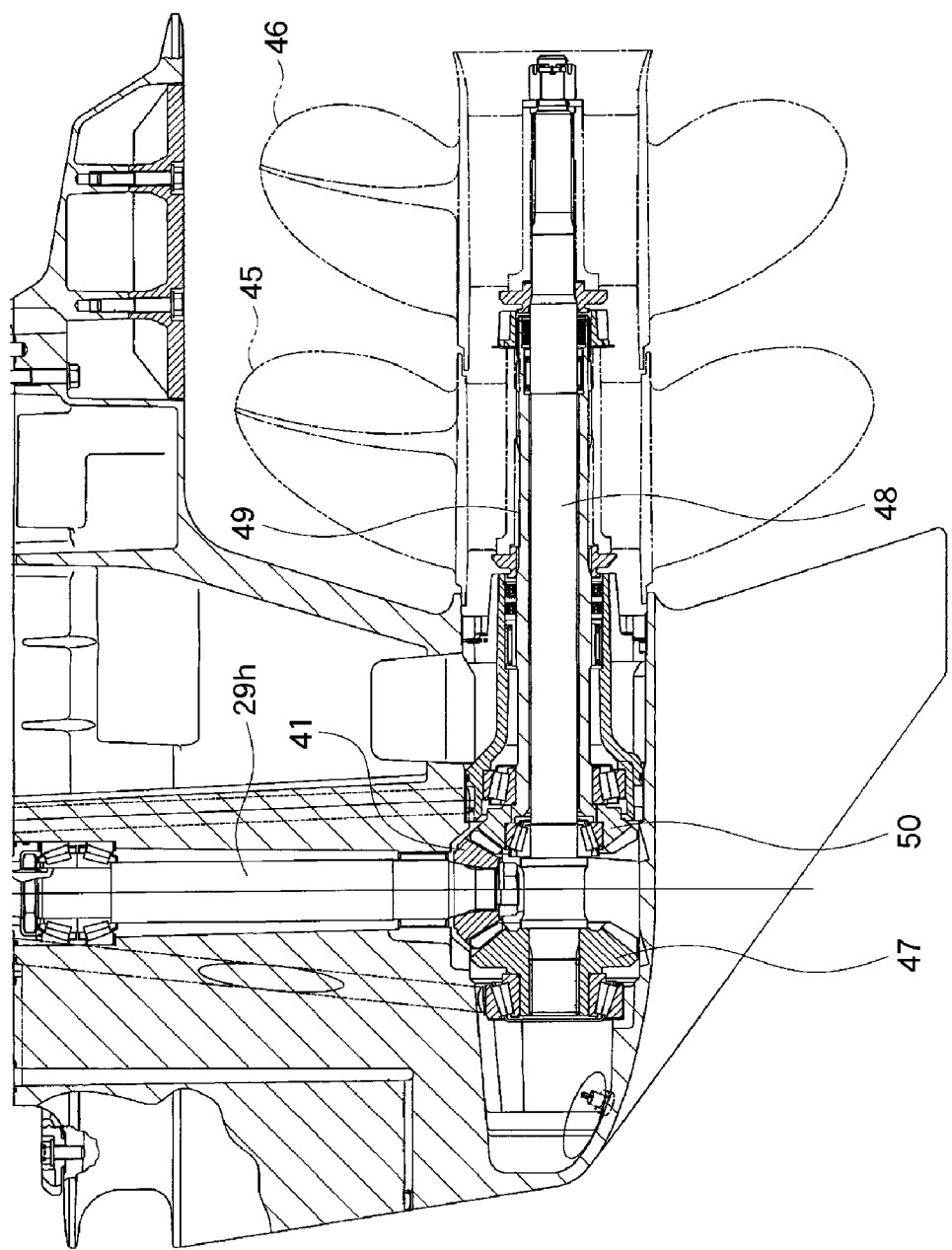
FIG. 13 is a cross-sectional view of the lower portion of an outboard motor according to a second preferred embodiment of the present invention.

FIG. 13 shows the second preferred embodiment of the present invention. The structure in the lower portion of the outboard motor 15 is shown in FIG. 13. The structure in the upper portion extending upward in FIG. 13 is preferably substantially the same as the first preferred embodiment having the transmission planetary gear train 35 and the shifting planetary gear train 36.

The second preferred embodiment differs from the first preferred embodiment in that a pair of propellers 45, 46 are arranged to rotate in opposite directions with respect to each other.

In the second preferred embodiment, a driven gear 47 in the front portion is engaged with the first propeller shaft 48 to rotate integrally with the first propeller shaft 48, and the first propeller shaft 48 extends toward the second propeller 46 to engage the second propeller 46 with the first propeller shaft 48. Also, a driven gear 50 in the rear portion is engaged with a second propeller shaft 49 to rotate integrally with the second propeller shaft 49, and the second propeller shaft 49 extends toward the first propeller 45 to engage the first propeller 45 with the second propeller shaft 49.

The pinion gear 41 attached to the lower end of the output end shaft 29b engages simultaneously with both the driven gears 47, 50. As the pinion gear 41 rotates in a given direction, driven gears 47, 50 rotate in directions opposite to each other, causing the first and the second propellers 45, 46 to rotate in directions opposite to each other.

In the arrangement described above, each of the propellers 45, 46 can rotate in directions opposite to each other at three different speeds by controlling the transmission planetary gear train 35. At the same time, the first and the second propellers 45, 46 can be shifted into forward, neutral, and reverse gears by controlling the shifting planetary gear train 36.

Since the pinion gear 41 is always engaged with both of the driven gears 47, 50 in this arrangement, the gear change can be accomplished without interrupting the output power or without changing the mesh between the gears during the gear change operation, and the force for driving the propeller is not interrupted. Thus, for boats having a substantially larger running resistance than land transportation vehicles, the gear change operation can be made easily, even in the course of acceleration, and the optimized gear change timing is assured.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
   a power transmission mechanism arranged to transfer an output power from an engine to a propeller; wherein
   the power transmission mechanism includes a transmission planetary gear train that is arranged to transform the output power of the engine before transferring the output power of the engine to the propeller;
   the transmission planetary gear train includes a transmission sun gear, a transmission double planetary gear set, and a transmission internal gear, wherein a first transmission planetary gear of the transmission double planetary gear set meshes with the transmission sun gear, and a second transmission planetary gear of the transmission double planetary gear set meshes with the transmission internal gear;
   the transmission sun gear is connected via a first clutch to an input end shaft extending from the engine, and the transmission sun gear is also connected via a second one-way clutch to a mounting member;
   the transmission double planetary gear set is connected via a second clutch to the input end shaft extending from the engine, and the transmission double planetary gear set is also connected via a first one-way clutch to the mounting member;
   the transmission internal gear is connected to an output end shaft extending toward the propeller; and
   the transmission planetary gear train is arranged such that when the second clutch is engaged and the first clutch is disengaged, rotational movement of the transmission sun gear is restricted by the second one-way clutch, causing the transmission double planetary gear set to make an orbital motion around the transmission sun gear, and the transmission internal gear to rotate in the same direction as the orbital motion of the transmission double planetary gear set around the transmission sun gear so as to deliver a second output power to the output end shaft extending toward the propeller.

2. The outboard motor according to claim 1, wherein the transmission planetary gear train is arranged such that when both the first clutch and the second clutch are engaged, the transmission sun gear, the transmission double planetary gear set, and the transmission internal gear rotate integrally to deliver a third output power to the output end shaft extending toward the propeller at a speed equal to the speed of the input end shaft.

3. An outboard motor comprising:
   a power transmission mechanism arranged to transfer an output power from an engine to a propeller; wherein
   the power transmission mechanism includes a transmission planetary gear train that is arranged to transform the output power of the engine before transferring the output power of the engine to the propeller;
   the transmission planetary gear train includes only one transmission sun gear, a transmission double planetary gear set, and a transmission internal gear, wherein a first transmission planetary gear of the transmission double planetary gear set meshes with the only one transmission sun gear, and a second transmission planetary gear of the transmission double planetary gear set meshes with the transmission internal gear;
   the only one transmission sun gear is connected via a first clutch to an input end shaft extending from the engine, and the only one transmission sun gear is also connected via a second one-way clutch to a mounting member;
   the transmission double planetary gear set is connected via a second clutch to the input end shaft extending from the engine, and the transmission double planetary gear set is also connected via a first one-way clutch to the mounting member;
   the transmission internal gear is connected to an output end shaft extending toward the propeller; and
   the outboard motor further comprises:
   a shifting planetary gear train arranged below the transmission planetary gear train; wherein
   the shifting planetary gear train includes a shifting sun gear, a shifting double planetary gear set, and a shifting internal gear;
   the shifting double planetary gear set is connected to the output end shaft connected to the transmission internal gear, and the shifting sun gear is connected to a second output end shaft extending toward the propeller; and
   the shifting internal gear is connected to the mounting member via a reverse/neutral clutch, and the shifting double planetary gear set is connected to the shifting internal gear via a forward clutch.

4. The outboard motor according to claim 3, wherein the transmission planetary gear train is arranged such when the first clutch is engaged and the second clutch is disengaged, rotational movement of the transmission double planetary gear set is restricted by the first one-way clutch causing the only one transmission sun gear to rotate about its axis, and the transmission internal gear to rotate in the same direction as the only one transmission sun gear by way of the first and second transmission planetary gears of the transmission double planetary gear set rotating about their axes so as to deliver a first output power to the output end shaft extending toward the propeller.

5. The outboard motor according to claim 3, wherein the shifting planetary gear train is arranged such that when the forward clutch is engaged and the reverse/neutral clutch is disengaged, the shifting sun gear, the shifting double planetary gear set, and the shifting internal gear rotate integrally resulting in the rotational movement of the transmission planetary gears of the transmission planetary gear train and the shifting sun gear of the shifting planetary gear train in the same direction and at the same speed to achieve a forward operation state.

6. The outboard motor according to claim 5, wherein the shifting planetary gear train is arranged such that when both the forward clutch and the reverse/neutral clutch are disengaged, the shifting sun gear, the shifting double planetary gear set, and the shifting internal gear rotate freely and independently, resulting in no output power from the shifting sun gear of the shifting planetary gear train derived from an input power from the transmission internal gear of the transmission planetary gear train, to achieve a neutral operation state.

7. The outboard motor according to claim 6, wherein the shifting planetary gear train is arranged such that when the forward clutch is disengaged and the reverse clutch is engaged, the shifting internal gear is locked while the shifting double planetary gear set and the shifting sun gear rotate resulting in the rotational movement of the transmission internal gear of the transmission planetary gear train and the shifting sun gear of the shifting planetary gear train in directions opposite to each other so as to achieve a reverse operation state.

8. The outboard motor according to claim 3, further comprising a water pump drivably connected to a water pump power shaft, wherein the water pump power shaft is arranged to rotate freely around the second output end shaft, and the water pump power shaft is connected to the shifting double planetary gear set.

9. The outboard motor according to claim 3, wherein at least one of the first clutch, the second clutch, the first one-way clutch, and the second one-way clutch includes multiple discs.

10. The outboard motor according to claim 3, wherein:
the power transmission mechanism is arranged to transfer the output power from the engine to a first propeller and a second propeller;
a contra-rotating propeller mechanism is arranged to rotate the first propeller and the second propeller in directions opposite to each other; and
the power transmission mechanism includes the transmission planetary gear train arranged to alter the transmission gear ratio between the input end and the output end.

11. The outboard motor according to claim 10, wherein the contra-rotating propeller mechanism includes two driven gears to drive the first propeller and the second propeller, respectively, and a pinion gear that simultaneously drives the two driven gears; and the output end shaft of the power transmission mechanism is connected to the pinion gear.

* * * * *